(12) United States Patent
Mayer

(10) Patent No.: US 10,747,341 B2
(45) Date of Patent: Aug. 18, 2020

(54) HEATED JOYSTICK

(71) Applicant: Nathan Jerome Mayer, Big Lake, MN (US)

(72) Inventor: Nathan Jerome Mayer, Big Lake, MN (US)

(73) Assignee: Nathan Jerome Mayer, Los Gatos, CA (US)

(*) Notice: Subject to any disclaimer, the term of this patent is extended or adjusted under 35 U.S.C. 154(b) by 50 days.

(21) Appl. No.: 16/216,869

(22) Filed: Dec. 11, 2018

(65) Prior Publication Data

US 2019/0179427 A1 Jun. 13, 2019

Related U.S. Application Data

(60) Provisional application No. 62/597,402, filed on Dec. 11, 2017.

(51) Int. Cl.
| | | |
|---|---|---|
| *G06F 3/038* | (2013.01) | |
| *H05B 1/02* | (2006.01) | |
| *A61G 5/10* | (2006.01) | |
| *H05B 3/44* | (2006.01) | |
| *G05G 9/047* | (2006.01) | |

(52) U.S. Cl.
CPC ............... *G06F 3/038* (2013.01); *A61G 5/10* (2013.01); *H05B 1/0227* (2013.01); *H05B 3/44* (2013.01); *A61G 2203/14* (2013.01); *G05G 9/047* (2013.01); *H05B 2203/022* (2013.01)

(58) Field of Classification Search
CPC ......... G06F 3/038; H05B 3/44; H05B 1/0227; H05B 2203/022; A61G 5/10; A61G 2203/14; G05G 9/047
See application file for complete search history.

(56) References Cited

U.S. PATENT DOCUMENTS

| | | | |
|---|---|---|---|
| 5,828,034 A | 10/1998 | Chang | |
| 5,850,741 A | 12/1998 | Feher | |
| 6,126,539 A | 10/2000 | Miller et al. | |
| 6,135,876 A * | 10/2000 | Song | G06F 3/03543 345/163 |
| 6,736,719 B1 | 5/2004 | Gehring et al. | |
| 6,830,511 B2 | 12/2004 | Ghering et al. | |
| 6,878,902 B2 | 4/2005 | Lyle et al. | |
| 2013/0008882 A1 * | 1/2013 | Hu | H05B 3/20 219/209 |
| 2017/0347400 A1 * | 11/2017 | Krusto | H05B 3/44 |

* cited by examiner

*Primary Examiner* — Alexander Eisen
*Assistant Examiner* — Kebede T Teshome
(74) *Attorney, Agent, or Firm* — Fish & Richardson P.C.

(57) ABSTRACT

In some implementations, a joystick includes a control unit having a first surface and a handle positioned at an angle adjacent to the first surface. The handle can have a second surface and is operably connected to the control unit. The joystick can further include a heating element, a blower, one or more vent openings in at least one of the first surface and the second surface, and a power source. The blower can move air warmed by the heating element through the at least one or more of the vent openings.

20 Claims, 10 Drawing Sheets

HEATED JOYSTICK

CROSS-REFERENCE TO RELATED APPLICATIONS

This application claims priority to U.S. Provisional Patent Application No. 62/597,402, entitled HEATED JOYSTICK and filed on Dec. 11, 2017, the entire contents of which are hereby incorporated by reference.

TECHNICAL FIELD

This document generally describes heated joysticks, and more particularly heated joysticks for operating machines such as wheelchairs, to keep a user's fingers, hands, arms, and/or body generally warm in cold environments.

BACKGROUND

Joysticks are mechanisms that serve as machine/device interfaces that users manipulate in order to operate any of a variety of machines and/or devices, such as vehicles (e.g., wheelchairs, planes), construction equipment (e.g., skid steer), remote controlled devices (e.g., remote control cars, remote control planes), electronic displays (e.g., video game controller, camera controller), and/or other machines/devices. Joysticks generally have an articulable handle that extends from and is able to pivot relative to a base along one or more axes. For example, joysticks can be unidirectional, bidirectional, or omnidirectional, depending on the arrangement of the hinged connection between the handle and the base. Joysticks include components to translate joystick articulation into one or more control signals (e.g., electronic control signals, direct or indirect mechanical linkage), such as sensors, potentiometers and strain gauges.

Joystick operation often requires precise control of the joystick in order to ensure the machine/device controlled by the joystick operates in the desired manner. However, joystick operators can sometimes experience discomfort and limited control or mobility of the joystick when the fingers, hand, arm, or other part of the body operating the joystick becomes cold. For example, the body part may get cold in external environment conditions (e.g., seasonal weather) and internal environment conditions (e.g., working in a cold storage room). Hand sweat can also limit control of the joystick, especially in existing implementations intended to warm a body part.

SUMMARY

This document generally describes heated joysticks, which are joysticks that include one or more elements to deliver heat to or around an operator's hand, arm, and/or body more generally. Heated joysticks are intended to benefit operators in many situations. For example, heated joysticks can warm the operator's hand or other body part without making the hand or body part sweat in cold and uncomfortable environments. In other examples, heated joysticks can blow air onto the operator's hand or other body part to dry off sweat on the hand or other body part, especially in warmer and uncomfortable environments.

Example heated joysticks can include a joystick handle operably connected to a joystick control unit. Heated joysticks can further include a heating element and/or a blower, both of which can be either operably connected to the control unit and/or situated in an adjacent external heating unit that is operably connected to the control unit. At least one of the heating element and the blower can be situated inside a cavity of the control unit. Heated joysticks can further include a handle that is connected to the control unit and intended to be manipulated by the operator to use a machine/device. Heat can be transmitted through the handle and to an operator's hand, arm, and/or body more generally. This can be accomplished by warming the air around the operator's hand, arm, and/or body. This can also be accomplished by warming an interior of the handle so that when the operator puts his or her hand, arm, and/or body on the handle, he or she feels the warmth from within the handle. In some examples, a surface of the control unit and/or the handle can have one or more vent holes/openings that allow passage of warm air from the heating element and/or blower and out towards the operator's hand. The warm air may further be directed from the heating element and through the vent holes in at least one of the control unit and the handle by the blower. The vent holes can be designed and positioned on the control unit and/or handle with any of a variety of configurations (e.g., variety of shapes, sizes, angles, and/or orientations) to direct warm air onto the operator's hand, arm, and/or body more generally. The vent holes can be designed and positioned to meet the needs of different uses of the heated joystick (e.g., gaming, moving a wheelchair), the machine/device controlled by the heated joystick (e.g., remote-control vehicle, wheelchair, machinery), and any external conditions (e.g., cold climate, hot climate, workspace environment).

Heated joysticks as described throughout this document can be used by a variety of operators (e.g., machinery operator, wheelchair operator), in a variety of different conditions (e.g., cold weather, warm weather, refrigerated warehouse), and in a variety of different contexts (e.g., controller for wheelchair, controller for machinery, controller for vehicle, controller for remote device). For example, a wheelchair operator travelling outside during cold weather conditions can use a heated joystick to warm his or her hand so that it does not get cold while operating the wheelchair. In another example, a wheelchair operator traveling outside in hot weather conditions can use a heated joystick to blow air on his or her hand so that it does not sweat while operating the wheelchair. The heated joystick can help the operator maintain sufficient dexterity in his/her hand to continue to effectively control the wheelchair in various different conditions. Heated joysticks can not only help operators in cold and/or warm environments, but heated joysticks can also aid operators who suffer from circulatory disorders and/or other disorders that cause the operators' extremities (e.g., hands, arms, and/or body generally) to become cold or sweaty under various conditions (e.g., moderate temperatures, positioning of an extremity relative to the rest of the body for an extended period of time). Overall, heated joysticks can help operators warm their extremities and/or reduce sweating during joystick operation, further assisting operators to continue maintaining comfortable operating conditions and effective control of the joystick as well as the machine/device manipulated by the joystick.

A variety of additional and/or alternate features are possible with the heated joysticks described herein. For example, an additional forearm extension unit can be adjacent to the control unit and/or the external heating unit to direct warm air through one or more vent holes/openings in the forearm extension unit to warm an operator's forearm in addition to warming the operator's hand that operates the joystick. The warm air in the forearm extension unit may be provided by the same heating element that provides warm air in the joystick handle. The warm air in the forearm extension unit may also be provided by a separate heating element present in the forearm extension unit or a separate, external heating element. For example, in some cases, a single blower can direct warm air through the vent holes in the joystick handle and control unit, as well as through the vent holes in the forearm extension unit. In other examples, a separate blower can be provided to direct warm air through only the vent holes in the forearm extension unit.

Heated joysticks can be manufactured by original equipment manufacturers (OEMs), or can be retrofitted to preexisting (e.g., non-heated) joysticks. For example, joystick handles with one or more vent holes/openings can be retrofitted onto existing joysticks by replacing the existing joysticks. In other embodiments, retrofitting the joystick handles can be accomplished by placing the heated joystick handles over the existing joysticks. Additionally, the heating units and/or the control units containing at least one of the heating element and/or the blower can be retrofitted onto existing joystick control units. This retrofitting can be accomplished with kits that contain the joystick handle, external heating units, and/or control units containing at least one of the heating element and/or the blower that can be applied to the preexisting (e.g., non-heated) joysticks and/or control units.

In some implementations, a joystick includes a control unit having a first surface comprising a cavity housing and at least one control element selected from a shaft, a gimbal, and a circuit board. The joystick can also include a handle positioned at an angle adjacent to the first surface. The handle can have a second surface and is operably connected to the control unit. The joystick can further include a heating element that is operably connected to the control unit and a blower that is operably connected to the control unit. One or more vent openings may exist in at least one of the first surface of the control unit and the second surface of the handle. The blower moves air warmed by the heating element through the at least one or more vent openings. The joystick can further include a power source that is operably connected to the control unit. The power source provides power to at least one of the heating element and the blower. The power source can be externally connected and independent of the power source for the machine/device that is being controlled by the joystick (e.g., secondary power source attached to the machine/device). In other embodiments, the joystick can be connected to the power source of the machine/device that is controlled by the joystick.

Certain implementations can optionally include one or more of the following features. The joystick can have an external heating unit positioned adjacent to and operably connected to the control unit. At least one of the heating element and the blower can be located within the external heating unit. The control unit can have a tube positioned within the cavity housing and operably connected to the external heating unit, such that the tube is operable to direct air flow from the external heating unit and through the one or more vent openings in the first surface of the control unit and the second surface of the handle. At least one of the heating element and the blower can be located within the cavity of the control unit. Further, the one or more vent openings can be located on at least one of the handle and the control unit. At least one of the one or more vent openings comprises an aperture in the first surface of the control unit through which the handle or a shaft connecting the handle to the control unit passes. The handle can be selected from a ball knob handle, a t-bar handle, a straight handle, a mushroom head handle, and a u-shaped handle. The handle can also be selected from other variations of handles.

The handle can further comprise a distal portion having an elongated cylindrical shape with a distal tapered end and a proximal tapered end. The handle can also have a proximal portion extending circumferentially from the proximal tapered end of the distal portion, thereby forming a fluted outer surface having a greater radial cross section than the distal portion of the handle. The one or more vent openings can be located on at least one of the distal portion of the joystick handle and the fluted proximal portion of the joystick handle. In another embodiment, the one or more vent openings can be positioned circumferentially around a central axis passing from the distal portion to the proximal portion of the joystick handle.

The joystick can further comprise a shield extending circumferentially around from the shaft and adjacent to the first surface of the control unit. The shield can be frusto-conical. In some embodiments, the shield can be a diaphragm. One or more vent openings can be located on the shield. The joystick can further comprise a forearm extension unit adjacent to the control unit, wherein at least one or more vent openings are positioned on the forearm extension unit and the blower is operable to move air through the at least one or more vent openings. In another embodiment, the joystick can comprise a forearm extension unit adjacent to the external heating unit wherein at least one or more vent openings are positioned on the forearm extension and the blower is operable to move air through the at least one or more vent openings. The joystick can further include a second blower that is configured to move air through the at least one or more vent openings of the forearm extension unit. In yet another embodiment, the control unit can be operable to connect to a machine and provide, to the machine, information regarding a position of the handle. In some embodiments, the machine can be a wheelchair. In other implementations, the machine can be any one or more machines and/or devices that can be manipulated by the joystick.

In some implementations, a joystick heating unit comprises a heating element, a blower, and a power source. The heating unit can be operable to connect to a joystick control unit and configured to move air out of the joystick control unit through at least one or more vent openings and towards a joystick handle. The blower can be connected to the joystick control unit and configured to move air from the heating unit and out through at least one or more vent openings towards the joystick handle. Further, the power source can be configured to connect to the heating unit and configured to supply power to at least one of the heating element and the blower. The power source can be an external power source. In another implementation, the heating unit can be connected to the power source of the machine/device that is manipulated by the joystick. Certain implementations can optionally include one or more of the following features. At least a portion of the heating unit can be inserted into the joystick control unit by at least one of a connector and a tube and further configured to direct air from the heating unit and through at least a portion of the joystick control unit. The joystick heating unit can further include a forearm heating portion that is configured to extend away from the joystick control unit when the joystick heating unit is operably connected to the joystick control unit. The forearm heating portion can comprise one or more vent openings. The forearm heating portion can further be connected to the heating element. In some implementations, the forearm heating portion can comprise a second heating element.

In some implementations, a joystick handle can optionally include one or more of the following features. The joystick handle can comprise a distal portion having an elongated cylindrical shape with a distal tapered end and a proximal tapered end. The handle can further comprise a proximal portion extending circumferentially from the proximal tapered end of the distal portion and forming a fluted outer surface having a greater radial cross section than the distal portion of the handle. The handle can further comprise one or more vent openings located on at least one of the distal portion of the joystick handle and the fluted outer surface of the handle.

In other implementations, a kit comprises the joystick handle as described in any of the preceding paragraphs. The kit can further include the joystick heating unit as described in any of the preceding paragraphs. The joystick heating unit can be configured to connect to a joystick control unit, wherein the control unit is further configured to attach to a machine and provide, to the machine, information regarding a position of the joystick handle. In some implementations, the machine is a wheelchair. Further, the kit can comprise a power source that is configured to connect to the joystick control unit and provide power to the joystick heating unit.

In some implementations, a method for retrofitting a joystick includes removing a first joystick handle and replacing the first joystick handle with a second joystick handle comprising one or more vent openings. The method can further comprise creating a first hole in a joystick control unit and connecting an external heating unit to the first hole in the joystick control unit. The method can further include creating a second hole in the joystick control unit and inserting a forearm extension unit into the second hole in the joystick control unit. The method can further comprise connecting a power source to the joystick control unit to power the external heating unit.

The implementations of the heated joystick as described throughout this document can provide one or more advantages. For example, blowing heated air through one or more vent openings in the joystick or joystick control unit allows heated air to directly warm parts of the hand, arm, or body generally needed to control the joystick and the machine/device that is manipulated by the joystick. Blowing air further aids in drying any sweat on the joystick controlling hand, arm, or body generally. For example, the joystick and control unit can be controllable by a user to selectively activate/deactivate the heating element independent of activation/deactivation of the blower unit, which can permit a user to control the unit to blow heated air or non-heated air through the joystick. In other environments, blowing heated air can prevent the hand, arm, or body generally from generating sweat while controlling the joystick in various environments (e.g., cold or warm environment). Contact-based heating elements that deliver heating to an operator's hand, arm, or body generally through direct physical contact between a heating element and the operator's hand, arm, or body generally, often limit heat transfer to only the areas of contact and can also make the areas of contact sweat. On the other hand, blower-based heated joysticks (as described throughout this document) can warm the operator's entire hand, arm, or body generally, which can increase the operator's comfort, dexterity, and overall ability to effectively use the joystick and manipulate the machine/device, while also ensuring the entire hand, arm, or body generally does not sweat.

In one example, targeted warming of the controlling hand, arm, or body generally can allow for greater efficiency in using the heating unit and therefore reduce power consumption. In one example, where the heating unit is attached to an external power source, energy used by the device/machine/vehicle/controller can be conserved because the heating unit takes power from the external power source. Targeted warming also ensure the portions of the controlling hand, arm, or body generally most needed for precise control of the joystick maintain mobility. Using targeted warm air, as opposed to gloves or shields, reduces the chance of interference with tactile control, hand sensitivity, hand and joystick visibility, and mobility.

In one example, existing (e.g., non-heated) joysticks can be retrofitted with external heating units and joystick handles that add heating to a control unit without having to replace the control unit or the device/machine/vehicle/controller more generally. This can permit operators to add beneficial and advantageous heating to an existing device/machine/vehicle/controller without having to purchase a new OEM unit (e.g., device/machine/vehicle/controller) that was originally manufactured with a heated joystick unit.

In yet another example, using blown warm air to make a joystick heated, causes the joystick to dry an operator's hand (e.g., creating a drying effect) by blowing the air through one or more vent openings on the joystick and over and/or around the operator's hand. This can be beneficial to the operator if the operator has a circular disorder or other disorder(s) that causes the operator to sweat. This can further be beneficial in warmer environments. The heated joystick can additionally and/or alternatively be manufactured with materials that absorb moisture from an operator's hand to further aid in drying the operator's hand during use and operation. This is especially beneficial where the operator keeps his/her hand on the joystick handle for extended periods of time.

In another example, forearm units can provide targeted warm air to the forearm of the operating arm of the joystick operator. The forearm unit(s) can increase warmth, comfort, and mobility in the wrist as well as the hand and arm of the operator. The forearm unit can increase the operator's comfort so that the operator can remain in a colder environment for extended periods of time with minimal to nonexistent discomfort while maintaining optimal control and use of the joystick in manipulating the machine/device.

For the terms "for example" and "such as," and grammatical equivalences thereof, the phrase "and without limitation" is understood to follow unless explicitly stated otherwise. As used herein, the term "about" is meant to account for variations due to experimental error. As used herein, the singular forms "a," "an," and "the" are used interchangeably and include plural referents unless the context clearly dictates otherwise.

Other features and advantages for the heated joystick will become apparent from the following detailed description, figures, and claims.

DETAILED DESCRIPTION

Figure 1A:
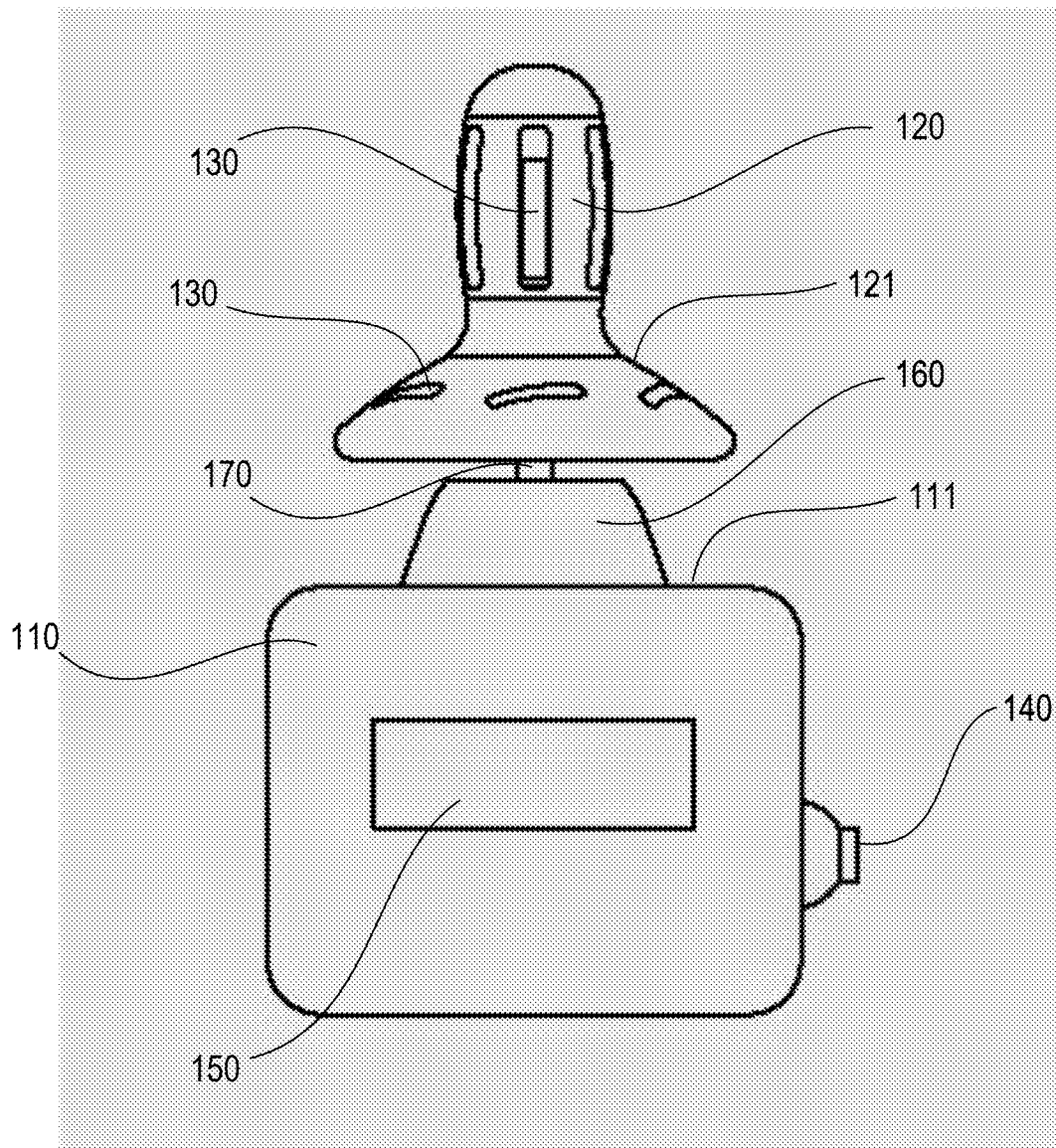
FIG. 1A is a side view of an example heated joystick.
Figure 1B:
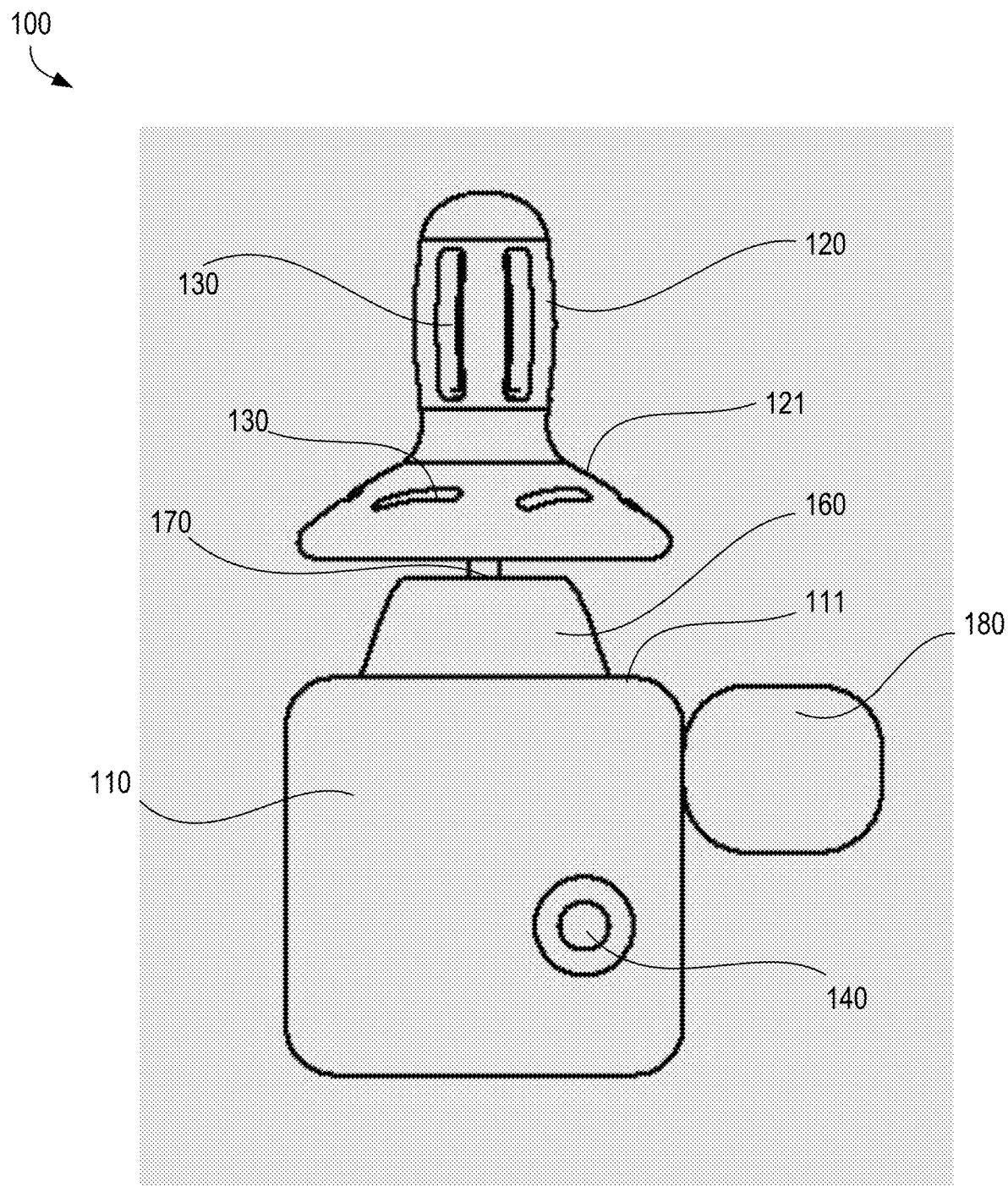
FIG. 1B is a side view of an example heated joystick with an external heating unit.
Figure 1C:
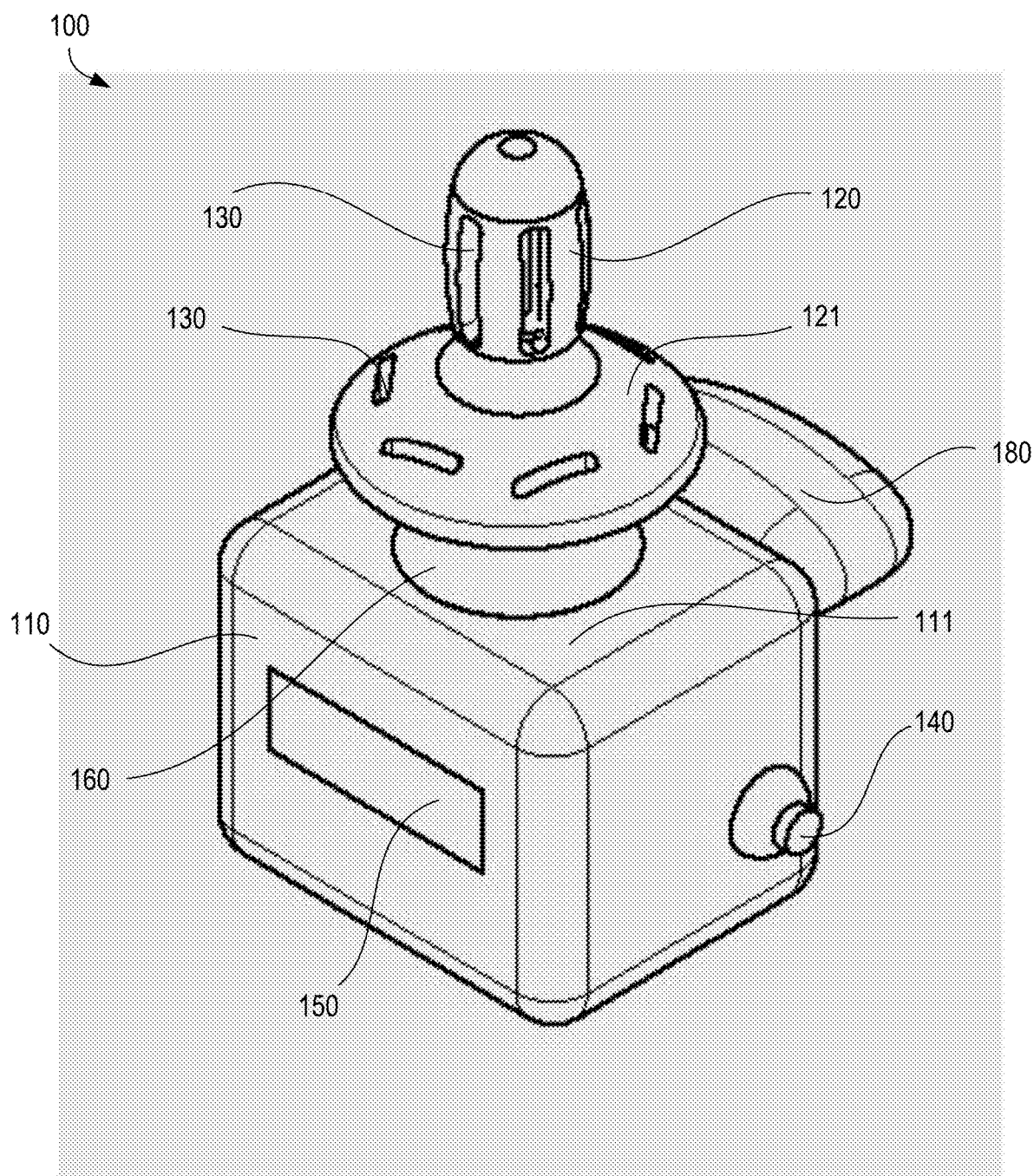
FIG. 1C is a perspective view of an example heated joystick.
Figure 1D:
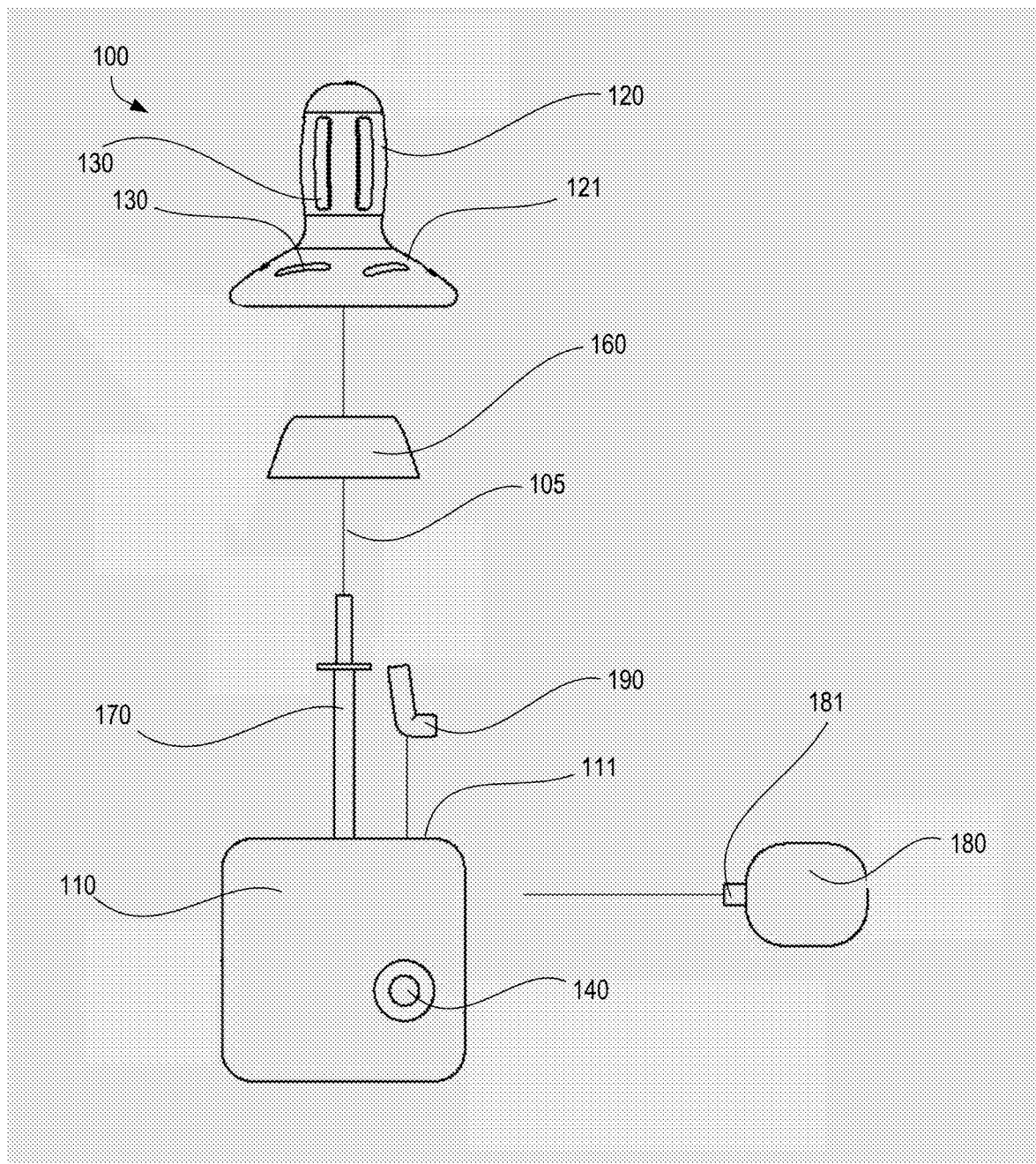
FIG. 1D is an exploded side view of an example heated joystick.
Figure 1E:
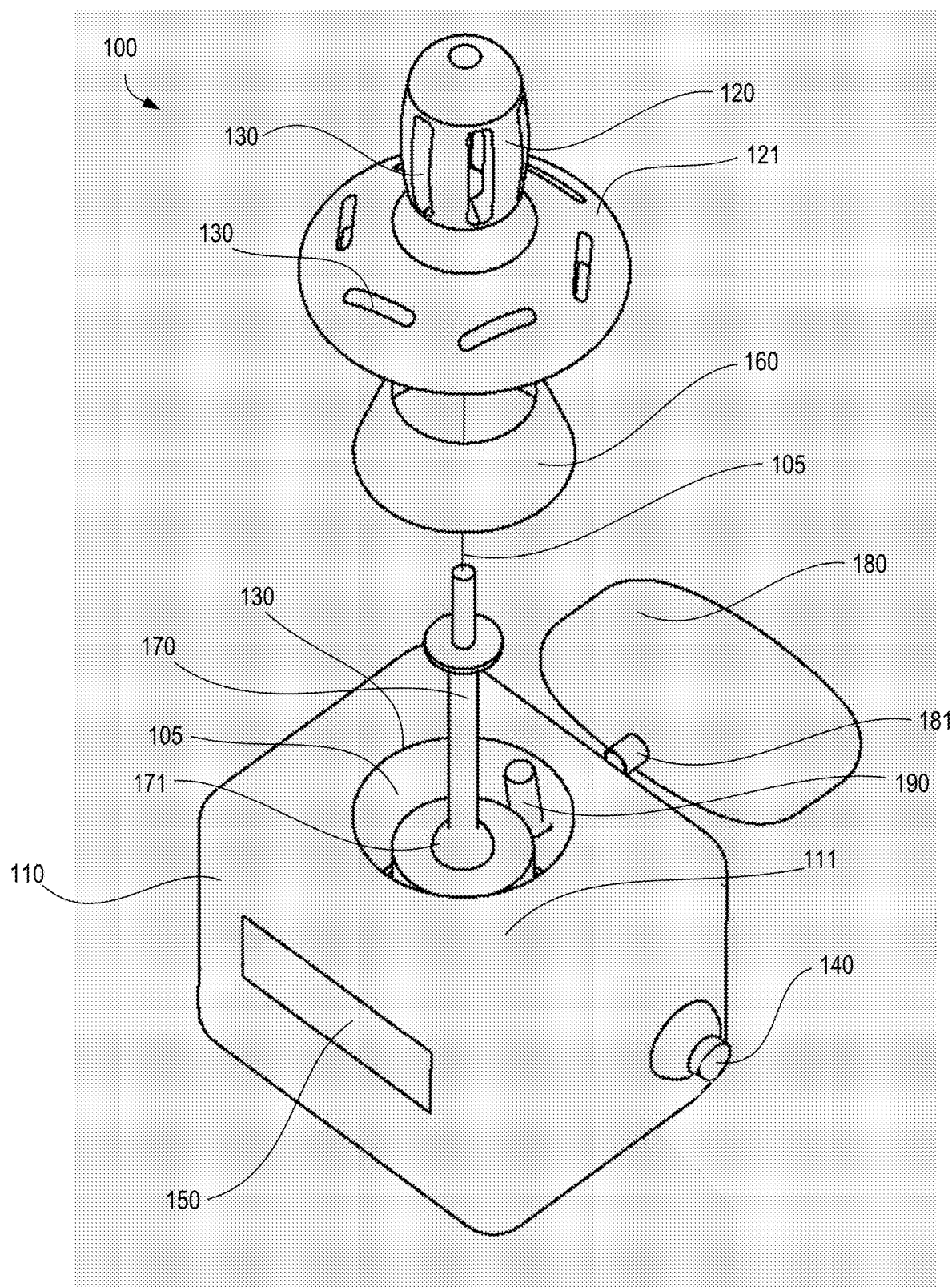
FIG. 1E is an exploded perspective view of an example heated joystick.

The disclosure is generally directed to heated joysticks, joystick heating units, joystick (or other controller) handles, and kits to retrofitted a heated joystick to an existing (e.g., non-heated) joystick. Heated joysticks can, for example, be useful for operating machinery and/or devices. Heated joysticks can also be useful for providing information, to the machinery and/or devices, regarding a position of the joystick handle. Heated joysticks can be used in a variety of contexts, such as being used to control/manipulate a vehicle (e.g., wheelchair, machinery), video gaming systems, robotic vehicles, remote control devices, construction vehicles, and/or other devices/systems that can be manipulated by joysticks. Heated joysticks can be beneficial in different environments, including cold environments (e.g., outdoor use during cold temperatures (e.g., winter, fall, spring), use in cold storage warehouse) and warm environments (e.g., outdoor using during warmer temperatures, such as during summer). In cold environments, heated joysticks can warm a body part of a joystick operator so that it does not get cold and lose mobility and/or accuracy in controlling/manipulating the joystick handle. In warm environments, heated joysticks can also blow air on and/or over the body part controlling the joystick handle so that the body part does not develop sweat and/or lose mobility and/or accuracy in controlling/manipulating the joystick handle. In both environments, heated joysticks are beneficial to blow air onto the body part of the operator to dry off sweat and/or to prevent the body part from generating sweat while operating the joystick handle. The air is blown through the joystick handle and out through one or more vent openings on the handle to then contact the operator's body part.

FIGS. 1A-1E depict an example joystick 100 that includes an example joystick control unit 110 and an example joystick handle 120. The joystick handle 120 is operably connected to the joystick control unit 110, and in one example, the handle 120 can be connected to the control unit 110 through a shaft 170 that is pivotally mounted to the control unit 110. In some embodiments, the shaft 170 can run along a central axis 105. In other embodiments, instead of the shaft 170, the control unit 110 can house a different control element, including but not limited to a gimbal 171 and a circuit board (not shown).

The control unit 110 can include a switch 140 (or other similar mechanism) that turns on heating controls to heat the joystick handle 120. The switch 140 can further be used to turn on and off a display 150. The switch 140 can be any of a variety of mechanisms that turn and/or power on and/or off one or more features of the joystick 100, such as push buttons, toggles, sensors (e.g., conductive sensors, proximity sensors, touch sensors, motion sensors), voice-activated switches (e.g., microphone, speech and audio processor, speech recognition module, command interpretation modeling), and/or other types of switches. The joystick 100 can include the display 150 which can visually output/display information, such as time information, temperature settings for the air and/or heating element that can be adjusted by the user, ambient temperature information (e.g., surrounding/outside air temperature), and/or other parameters or information useful to the joystick operator/user. The display 150 can include one or more corresponding input mechanisms through which a user can adjust the settings of the joystick 100, such as buttons, dials, keys, sensors, touchscreens, voice interfaces, and/or other user interface features.

The control unit can have a first surface 111 that defines a cavity housing at least one control element selected from the shaft 170, a gimbal, and a circuit board, and the handle 120 can be positioned at an angle adjacent to the first surface 111. A tube can be positioned within the cavity and operably connected to an external heating unit, such that the tube directs air flow from the external heating unit and through one or more vent openings 130. The handle 120 can have a second surface 121 which can be operably connected to the control unit. The one or more vent openings 130 can be formed in at least one of the second surface 121 of the handle 120, the first surface 111 of the control unit 110, and/or combinations thereof. The one or more vent openings 130 can have any of a variety of shapes, sizes, configurations, angles, and/or other characteristics to allow for air to flow through the handle 120. For example, at least one of the vent openings 130 can be an aperture in the first surface 111 of the control unit 110 through which the handle 120 or the shaft 170 connecting the handle 120 to the control unit 110 passes.

Warm air heated by a heating element (not shown) can be moved by a blower (not shown) through at least one or more of the vent openings 130. This warm air can warm a user's fingers, hand, and/or arm while the user is operating the joystick 100. The control unit 110 can additionally and/or alternatively be operated with just the blower activated (e.g., the heater is turned off), to blow unheated/cool air on the user's fingers, hand, and/or arm, which can be used to dry the user's fingers, hand, and/or arm and/or cool the user so that the user does not develop and/or reduces sweat on the body part that operates the joystick 100. The control unit 110 may additionally and/or alternatively be operated with just the heater activated (e.g., the blower is turned off), which may permit conductive elements of the control unit 110 and/or the joystick 100 more generally to radiate heat to the user's fingers, hand, and/or arm without blowing air over the user's fingers, hand, and/or arm (e.g., user may have dry skin and not want air to be blown on his/her hand to further dry it out). Heating elements and blowers can be located within the cavity and/or connected to the control unit 110 and/or other units that are attached to the control unit 110. The joystick 100 may further have a power source (not shown) that is connected to the control unit 110 that provides power to at least one of the heating element (not shown) and the blower (not shown).

In some embodiments, an optional shield 160 can extend around the shaft 170. In some embodiments, the shield 160 is frustoconical and extends circumferentially around the shaft 170. The shield 160 can be positioned adjacent to the first surface 111 of the control unit 110. The shield can, in some embodiments, aid in keeping dust and other unwanted particles out of a cavity 105 within the control unit 110 (e.g., FIG. 1D). The optional shield 160 can also, in some embodiments, serve to aid in directing warm air heated by the heating element towards the joystick handle 120 and/or towards the operating hand of a joystick operator. The optional shield 160 can further block wind and/or other elements from obstructing a body part from operating the joystick 100. In some embodiments, one or more vent openings 130 may be located on the shield 160. In other embodiments, the shield 160 can be a diaphragm. The cavity 105 can comprise one or more control elements, including a shaft 170, a gimbal 171, and a circuit board (not shown).

The heating element (not shown) can be positioned within a cavity (not shown in FIG. 1A) inside the control unit 110. A blower can additionally and/or alternatively be positioned within the cavity, or in an exterior housing operably connected to the control unit cavity. The blower directs air warmed by the heating element through the one or more vent openings 130. For example, the blower can direct warmed air towards the joystick handle 120 and onto a user's hand that controls and/or holds the joystick handle 120. In another example, the blower can direct warmed air towards a joystick operator's hand in an area surrounding the handle 120.

Referring to FIGS. 1B-1E, the heating element and/or blower can be situated in an external heating unit 180 positioned adjacent to and operably connected to the control unit 110. The external heating unit 180 can be inserted into and/or affixed to the joystick control unit 110. The external heating unit 180 can, for example, be connected to the control unit 110 through a connector 181. Air warmed in the external heating unit 180 can pass through the connector 181 into the cavity 105 of the control unit 110. The air warmed in the external heating unit 180 flows through at least a portion of the cavity 105 of the control unit 110 and out of the one or more vent openings 130 of the joystick handle 120 and towards the user's hand. In some embodiments, warm air from the external heating unit 180 can pass through the connector 181 into a tube 190 within the cavity 105 of the control unit 110. The tube 190 can be bent, angled, and/or positioned such that it can direct the warm air from the external heating unit 180 through the one or more vent openings 130. The tube 190 allows the warm air to pass through the cavity of the control unit 110 without adversely affecting items within the control unit cavity, such as circuit boards or other electronics (not shown). In some embodiments, the heating element and/or the blower can be attached to an external power source (not shown). In other embodiments, the external heating unit 180 can be attached to an external power source. In further embodiments, the heating element, the blower, and/or the external heating unit 180 can be attached to the power source of the machine/device that is manipulated by the joystick 100 (e.g., a wheelchair).

Figure 2A:
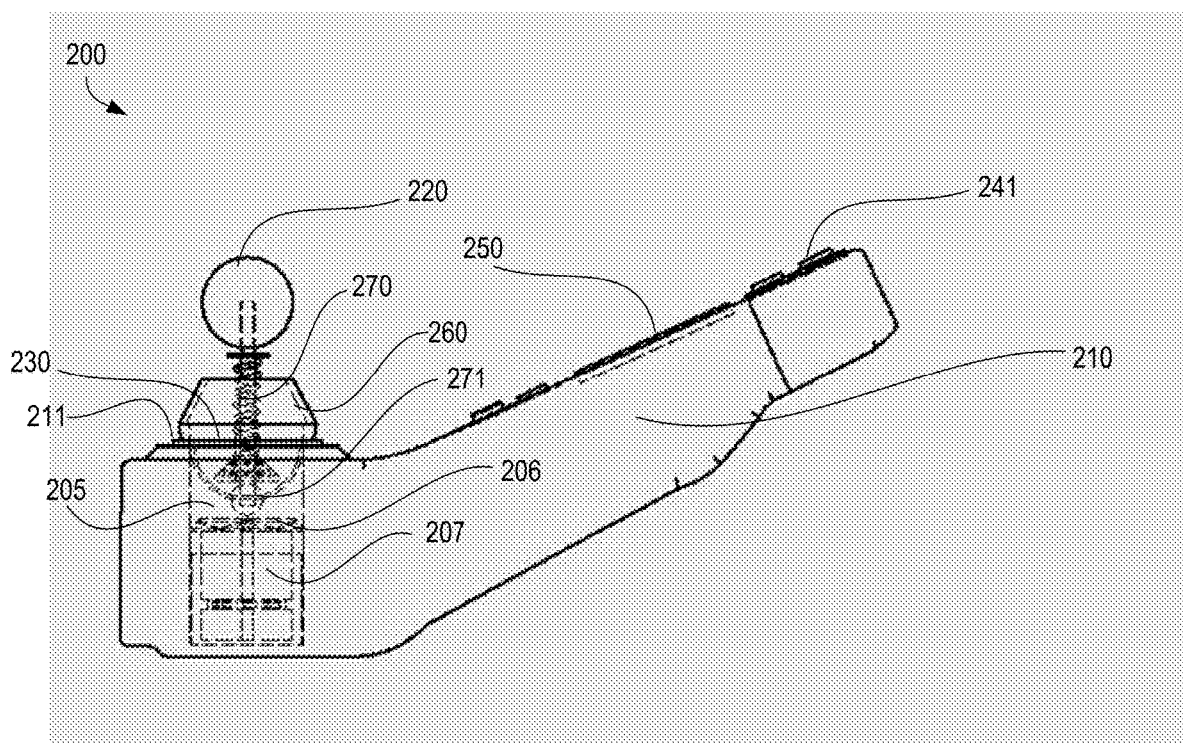
FIG. 2A is a side view of an example heated joystick.
Figure 2B:
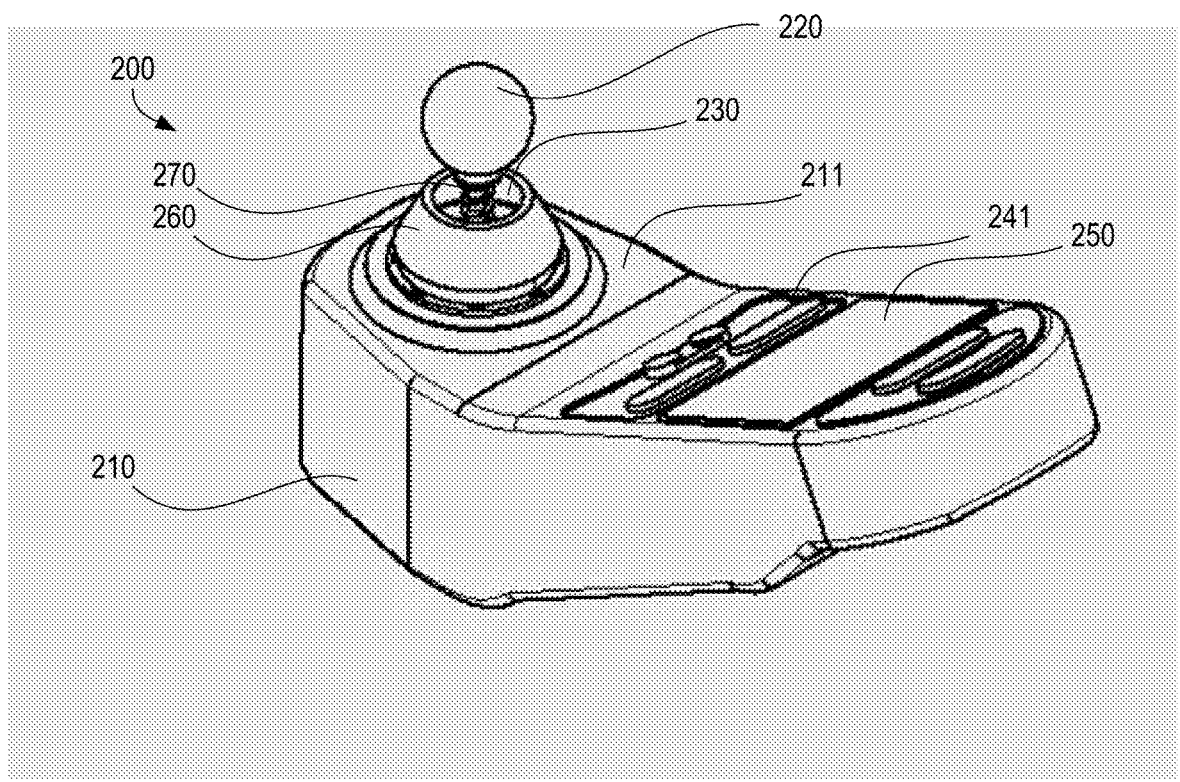
FIG. 2B is a perspective view of an example heated joystick.

In another example shown in FIGS. 2A-2B, a joystick 200 includes a heating element 206 and a blower 207 within a cavity 205 in a portion of a joystick control unit 210. The control unit 210 can include one or more displays 250 and one or more buttons 241 for controlling the machine/device that is controlled by the joystick 200, the heating element 206, and/or the blower 207. The blower 207 directs air warmed by the heating element 206 through one or more vent openings 230 in the first surface 211 of the control unit 210. The one or more vent opening 230 is an aperture in the first surface 211 of the control unit 210 through which a shaft 270 connecting the joystick handle 220 to the control unit 210 passes. An optional shield 260 can be positioned adjacent to the first surface 211 of the control unit 210 around the one or more vent opening 230. The shield 260 can extend along the shaft 270 between the handle 220 and the control unit 210, and aid in directing warmed air towards the handle 220. The shield 260 can be asymmetrically shaped and/or independently rotatable such that the shield 260 can be rotated to direct warmed air towards a specific location near the joystick 200 or joystick handle 220 as desired by a joystick operator.

Figure 3A:
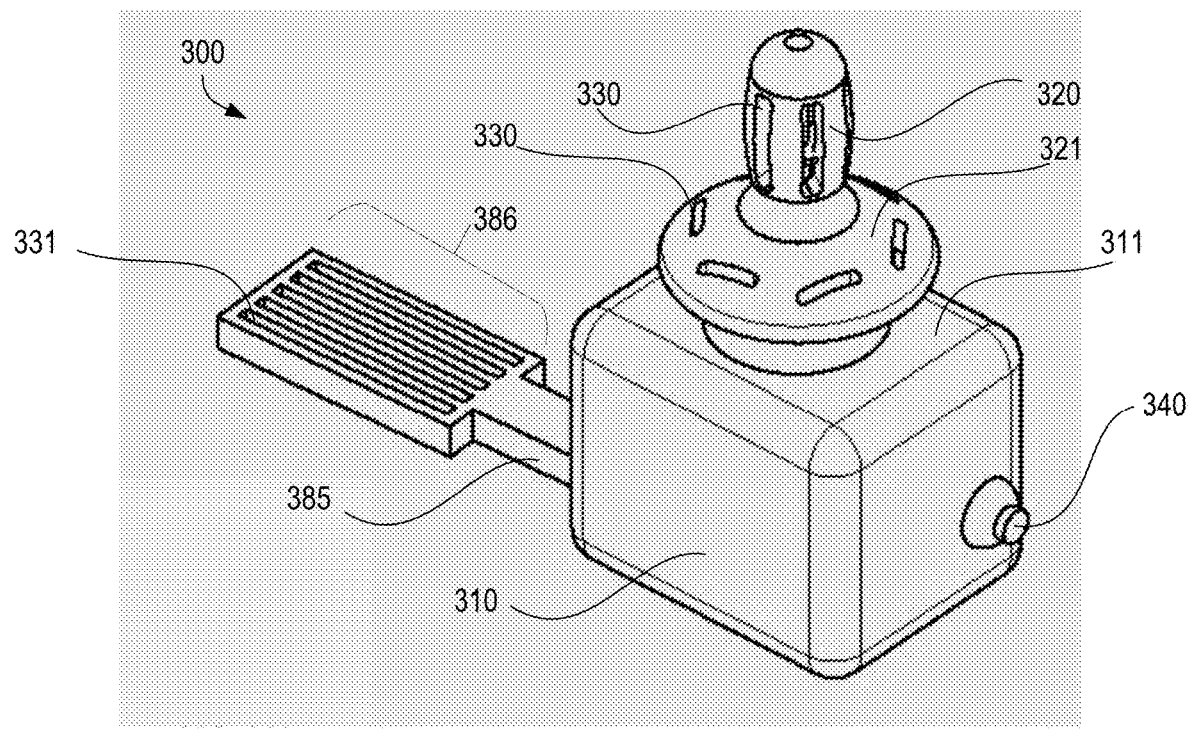
FIG. 3A is a perspective view of an example heated joystick with a forearm extension unit.
Figure 3B:
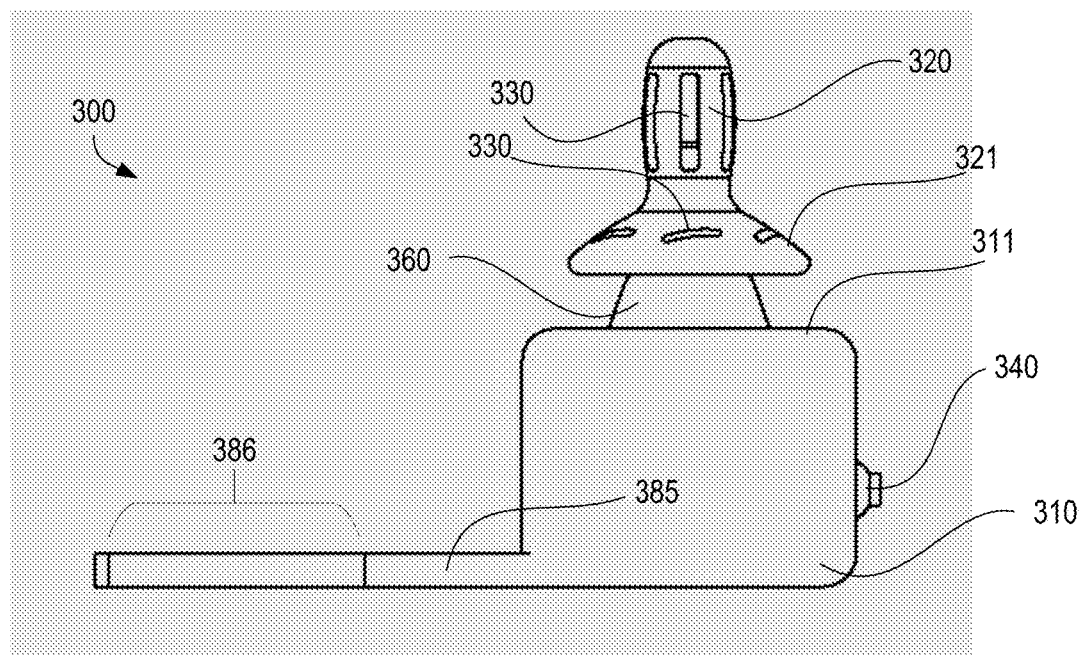
FIG. 3B is a side view of an example heated joystick.

Referring to FIGS. 3A-B, a joystick 300 can include a forearm extension unit 385 for providing warm air to a forearm or portion of an arm of a joystick operator. The forearm extension unit 385 can be positioned adjacent to the control unit 310 and/or to an external heating unit that is adjacent to the control unit 310. The forearm extension unit 385 can have a forearm heating portion 386 that includes one or more vent openings 331 and is operable to extend away from the control unit 310 when the forearm extension unit 385 is operably connected to the control unit 310. Air warmed by a common heating element can be directed by a common blower through the one or more forearm extension unit vent openings 331 and the one or more vent openings 330 located on the first surface 311 of the control unit 310 and/or the second surface 321 of the joystick handle 320. The forearm heating portion 386 can be connected to the common heating element. In other embodiments, the forearm heating portion 386 can include a second heating element that is separate from the heating element and blower that warms air and directs the warm air through the joystick control unit 310 and towards the joystick handle 320 through the one or more vent openings 330. The second heating element can be, for example, configured to supply warm air through the one or more forearm extension unit vent openings 331.

In some embodiments, a first blower operates to move warmed air through the vent openings 330 of the joystick handle 320 or the control unit 310, while a second blower operates to move warmed air through the at least one or more vent openings 331 of the forearm extension unit 385, which may use the same and/or different heating elements. A common heating element can warm air that will eventually passes through both the one or more vent openings 330 and 331. In some embodiments, a first heating element warms air that will eventually pass through the one or more vent openings 330, while a second heating element warms air that will eventually pass through the one or more vent openings 331. In other embodiments, the forearm extension unit 385 includes its own onboard heating element and/or blower that is separate from the heating element and blower that warms air and directs the warm air through the joystick control unit 310 and towards the joystick handle 320 through the one or more vent openings 330.

Figure 3C:
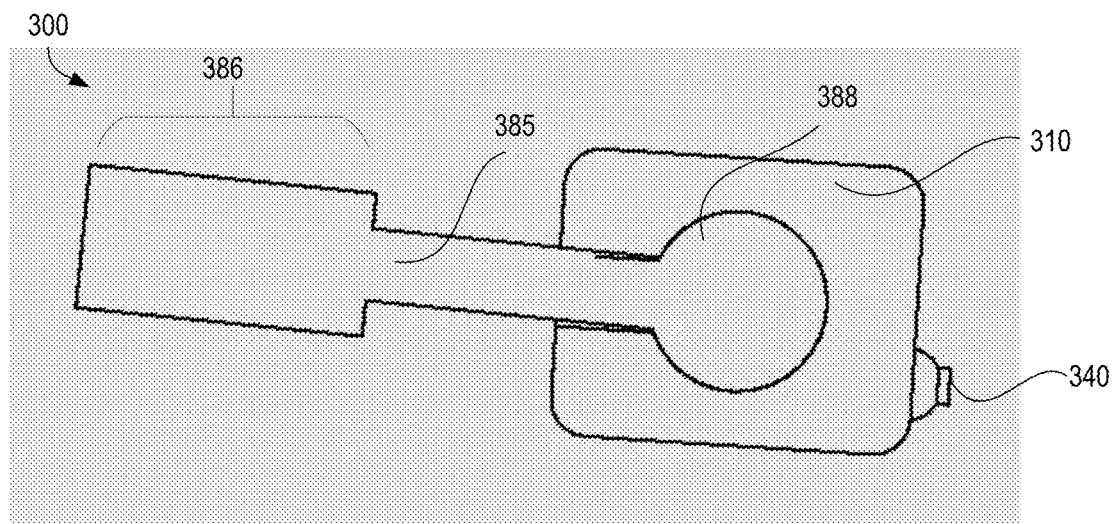
FIG. 3C is a bottom view of an example heated joystick.
Figure 3D:
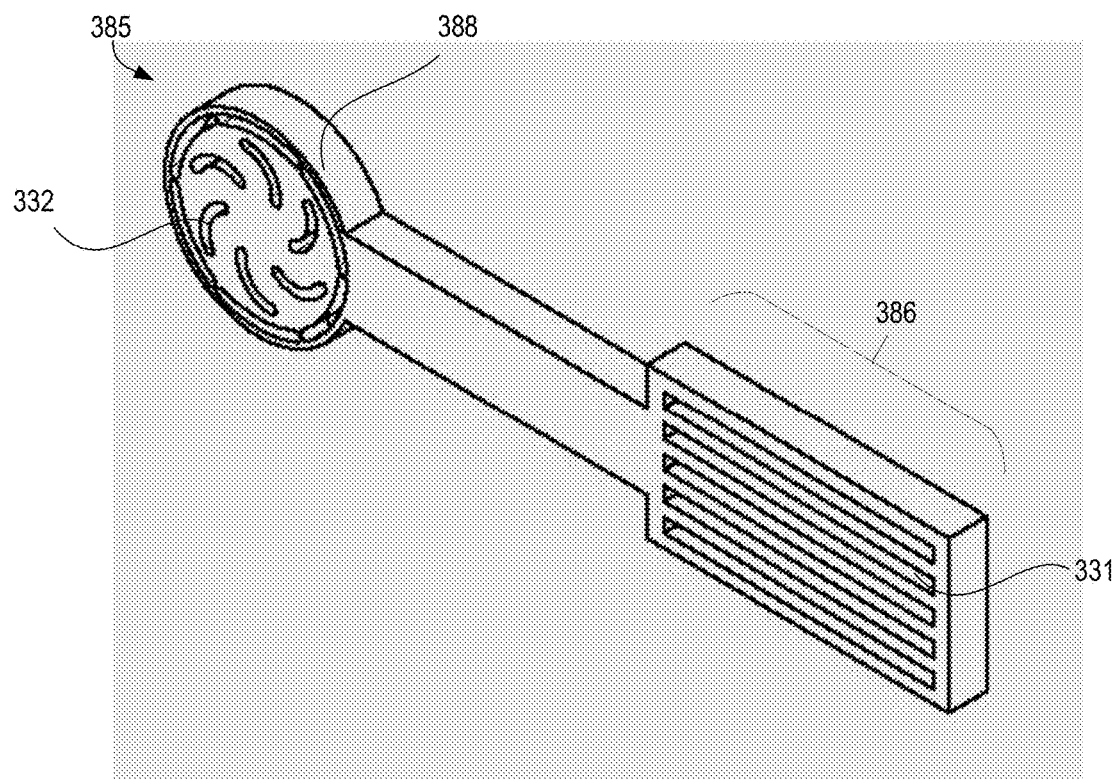
FIG. 3D is a perspective view of an example forearm extension unit.

Referring to FIGS. 3C-3D, the forearm extension unit 385 can be an optional independent unit that can be attached to and/or removed from the joystick control unit 310 or, in other embodiments, the external heating unit. As shown in FIG. 3D, an independent forearm extension unit 385 can house a common heating element and common blower that warms air and directs the warm air through both the at least one or more vent openings 331 on the forearm extension unit 385 and through the connecting one or more vent openings 332 on a connecting portion 388 of the forearm extension unit 385. The connecting portion 388 can operably connect and/or plug into a joystick control unit 310, as in FIG. 3C, and the air warmed by the common heating element within the forearm extension unit 385 can flow through the one or more vent openings 332 on the connecting portion 388 and into the cavity of the control unit 310, then further flow through the one or more vent openings 330 on the first surface 311 of the control unit, and/or on the second surface of the joystick handle 320.

Figure 4A:
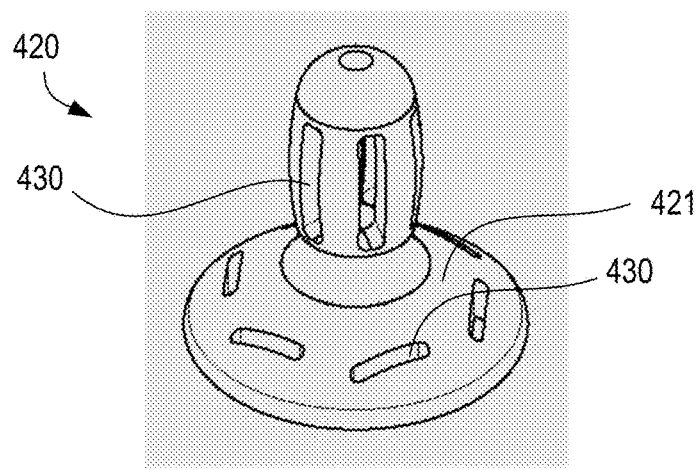
FIG. 4A is a perspective view of an example joystick handle.
Figure 4B:
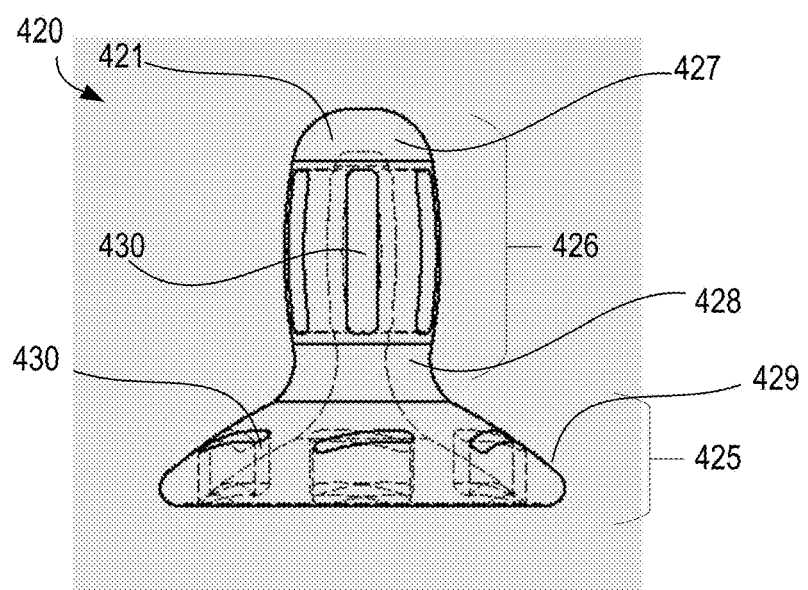
FIG. 4B is a side view of an example joystick handle.
Figure 4C:
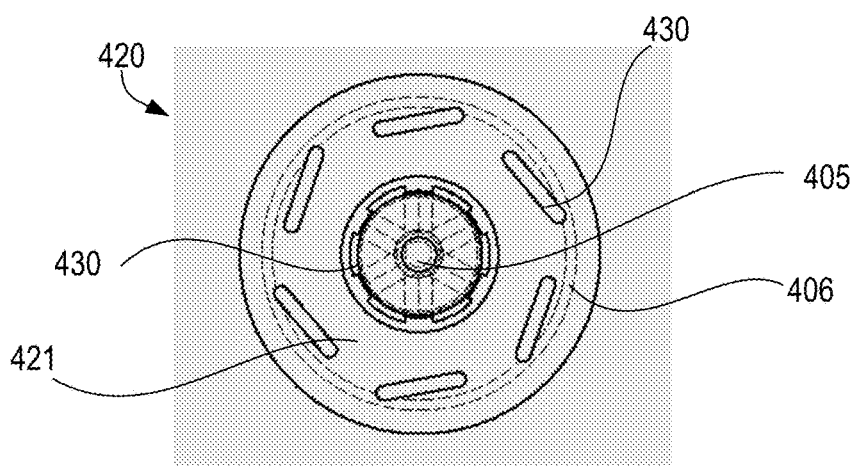
FIG. 4C is a top view of an example joystick handle.

Referring to FIGS. 4A-4C, a joystick handle 420 can include one or more vent openings 430 that direct air projected to a base of the joystick handle 420 (e.g., from a control unit) to a user's hand. The handle 420 can be any shape for a joystick handle, such as, for example, a ball knob handle, a t-bar handle, a straight handle, a mushroom head handle, and a u-shaped handle. The second surface 421 of the handle 420 can be made of materials that provide grip and/or absorbency to absorb sweat or other fluids. In some embodiments, the second surface 421 of the handle 420 is made of silicone, rubber, or other appropriate and/or similar materials. In some embodiments, the handle 420 can have a distal portion 426 having an elongated cylindrical shape with a distal tapered end 427 and a proximal tapered end 428. The handle can also have a proximal portion extending circumferentially from the proximal tapered end 428 of the distal portion 426 around a central axis 405, the central axis 405 passing from the distal portion 426 to the proximal portion 425. The proximal portion 425 can form a fluted outer surface 429 having a greater radial cross section than the distal portion 426 of the handle 420.

The one or more vent openings 430 can be located on the distal portion 426 of the handle 420 to direct air received at the base of the handle 420 through the body of the handle 420 and out to the user's hand, where the hand is gripping and/or near the handle 420. The one or more vent openings 430 can further be located on the fluted proximal portion 425 of the handle 420. In some embodiments, the one or more vent openings 430 are located on the distal portion 426 and on the fluted proximal portion 425 of the handle 420. In other embodiments, the one or more vent openings 430 are positioned circumferentially around a central axis 405, the central axis 405 passing from the distal portion 426 to the proximal portion 425 of the handle 420. The one or more vent openings 430 can be positioned, for example, orthogonal to an imaginary circle 406 having the central axis 405 as the circle's center. The one or more vent openings 430 can be specifically configured and tailored, with different sizes, shapes, configurations, and/or angles, to provide different distributions of air through the handle 420 and onto the user's hand. For example, a user may select from among multiple different handles 420, each having different one or more vent opening 430 configurations to select an air distribution that is best suited for the particular user and his or her needs. Various vent openings 430, such as orthogonal vent openings, can provide particular focusing of the warmed air onto the hand of an operator that is operating the joystick, which can improve the distribution of blown and/or heated air onto the user's hand.

Kits can further be provided to retrofit existing joysticks (e.g., that do not have heating and/or blower capabilities) with the heating capabilities described throughout this document. For example, retrofitting kits can include a heating unit and/or a forearm adapter that can be added to an existing control unit, and/or a joystick handle with one or more vent openings to distribute air to the user's hand. In some embodiments, a kit can include a joystick handle having one or more vent openings as described herein and/or a heating unit as described herein. The heating unit can be configured to connect to a joystick control unit. In some embodiments, the joystick control unit can be configured to attach to a machine and provide, to the machine, information regarding a position of the joystick handle. In some embodiments, a kit can include a forearm extension unit as described herein. In other embodiments, a kit can include an external power source that is configured to connect to the heating unit, forearm adapter, and/or joystick control unit to provide power to the heating unit.

In some embodiments, methods for retrofitting a joystick with an external heating unit and/or blower are provided herein. In some embodiments, a method for retrofitting a joystick includes removing a first joystick handle and replacing the first joystick handle with a second joystick handle comprising one or more vent openings therein, such as the joystick handles described herein. The method further comprises creating a first hole in a joystick control unit and connecting an external heating unit to the first hole in the joystick control unit. In some embodiments, connecting an external heating unit includes inserting a tube connected to the external heating unit into the first hole in the control unit. In some embodiments, retrofitting a joystick includes creating a second hole in the joystick control unit and inserting a forearm extension unit into the second hole in the control unit. In other embodiments, the method includes connecting a power source to the joystick control unit to power the external heating unit and/or blower.

The foregoing description is intended to illustrate example implementations, which may be modified in any of a variety of ways, including adding, removing, and modifying features that are described. Furthermore, features from different implementations can be combined and adapted in any possible combinations and/or sub-combinations. Other aspects, advantages, and modifications are within the scope of the following claims.

What is claimed is:

1. A joystick comprising:
   a control unit having a first surface defining, at least, a cavity housing at least one control element to control operation of an associated machine or device;
   a handle positioned at an angle adjacent to the first surface, wherein the handle has a second surface and is operably connected to the control element in the control unit;
   a heating element configured to warm air in and around the heating element when actuated;
   a blower configured to generate a flow of air, the blower being positioned adjacent the heating element to generate a flow of warm air when both the heating element and the blower are actuated;
   a power source configured to provide power to the heating element and the blower; and
   one or more vent openings that are defined in at least one of the first surface and the second surface, wherein the flow of warm air generated by the blower and the heating element emanates from the cavity of the control unit and through the at least one or more vent openings.

2. The joystick of claim 1, further comprising an external heating unit positioned adjacent to and operably connected to the control unit, wherein at least one of the heating element and the blower is located within the external heating unit.

3. The joystick of claim 2, further comprising a tube positioned within the cavity and operably connected to the external heating unit, wherein the tube is operable to direct air flow from the external heating unit through the one or more vent openings.

4. The joystick of claim 1, wherein at least one of the heating element and the blower is located within the cavity of the control unit.

5. The joystick of claim 1, wherein the one or more vent openings are located on the handle.

6. The joystick of claim 1, wherein at least one of the one or more vent openings comprises an aperture in the first surface of the control unit through which the handle or a shaft connecting the handle to the control element in the control unit passes.

7. The joystick of claim 1, wherein the handle is selected from a ball knob handle, a t-bar handle, a straight handle, a mushroom head handle, and a u-shaped handle.

8. The joystick of claim 1, wherein the handle comprises:
a distal portion having an elongated cylindrical shape with a distal tapered end and a proximal tapered end; and
a proximal portion extending circumferentially from the proximal tapered end of the distal portion, thereby forming a fluted outer surface having a greater radial cross section than the distal portion of the handle.

9. The joystick of claim 8, wherein the one or more vent openings are located on at least one of the distal portion of the joystick handle and the fluted proximal portion of the joystick handle.

10. The joystick of claim 8, wherein the one or more vent openings are positioned circumferentially around a central axis passing from the distal portion to the proximal portion of the handle.

11. The joystick of claim 1, further comprising a shield extending circumferentially around from the shaft and adjacent to the first surface of the control unit, wherein the shield is frustoconical.

12. The joystick of claim 11, wherein the shield is a diaphragm.

13. The joystick of claim 11, wherein one or more vent openings are located on the shield.

14. The joystick of claim 1, further comprising a forearm extension unit adjacent to the control unit, wherein at least one or more of the vent openings are positioned on the forearm extension unit and the blower is operable to move air through the at least one or more vent openings.

15. The joystick of claim 14, wherein a second blower is configured to move air through the at least one or more vent openings of the forearm extension unit.

16. The joystick of claim 1, wherein the control element in the control unit is operably connected to the machine or device and provides, to the machine or device, information regarding a position of the handle.

17. The joystick of claim 16, wherein the machine or device is a powered wheelchair.

18. The joystick of claim 1, wherein the control element includes one or more of: a shaft, a gimbal, and a circuit board.

19. A kit for retrofitting a joystick to include heating features to warm a user's hand, the kit comprising:
the joystick handle positioned configured to replace an existing joystick handle for a machine or device, the joystick handle being configured to be attached to a control unit for the machine or device, wherein the joystick handle includes a first surface defining one or more vent openings extending through a body of the joystick handle to channel air flow emanating from a joystick opening in the control unit through the one or more vent openings; and
an external joystick heating unit that is configured to be fluidly connected to the control unit, the external joystick heating unit including (i) a heating element that configured to warm air in and around the heating element when actuated, (ii) a blower that configured to generate a flow of air, and (iii) an outlet configured to be fluidly connected to an aperture in the control unit through which the flow of air from the blower is introduced into a cavity in the control unit, wherein the blower is positioned adjacent the heating element to generate a flow of warm air when both the heating element and the blower are actuated, wherein the outlet is configured to transmit the flow of warm air through the one or more vent openings in the joystick handle via an air channel provided by the aperture in the control unit, the cavity, and the joystick opening.

20. A method for retrofitting a joystick to include heating features to warm a user's hand, comprising:
removing a first joystick handle from a control unit for the machine or device;
replacing the first joystick handle with a second joystick handle that includes a first surface defining one or more vent openings extending through a body of the second joystick handle to channel air flow emanating from a joystick opening in the control unit through the one or more vent openings;
creating an aperture in the control unit; and
fluidly connecting an external joystick heating unit to the control unit via a fluid connection between the aperture in the control unit and an outlet of the external joystick heating unit, wherein the external joystick heating unit includes (i) a heating element that configured to warm air in and around the heating element when actuated and (ii) a blower that configured to generate a flow of air, wherein the flow of air from the blower is introduced into a cavity in the control unit, wherein the blower is positioned adjacent the heating element to generate a flow of warm air when both the heating element and the blower are actuated, wherein the outlet is configured to transmit the flow of warm air through the one or more vent openings in the joystick handle via an air channel provided by the aperture in the control unit, the cavity, and the joystick opening.

* * * * *